United States Patent
Wheeless, Jr. et al.

[15] 3,657,537
[45] Apr. 18, 1972

[54] COMPUTERIZED SLIT-SCAN CYTO-FLUOROMETER FOR AUTOMATED CELL RECOGNITION

[72] Inventors: Leon L. Wheeless, Jr., Webster; Stanley F. Patten, Jr., Penfield, both of N.Y.

[73] Assignee: Bausch & Lomb Incorporated, Rochester, N.Y.

[22] Filed: Apr. 3, 1970

[21] Appl. No.: 25,336

[52] U.S. Cl. .......................250/71 R, 250/83.3 UV, 356/39
[51] Int. Cl. ..........................................................G01t 1/16
[58] Field of Search ..................250/71 R, 83.3 UV, 83.3 R; 356/39; 324/71 LC

[56] References Cited

UNITED STATES PATENTS

| | | | |
|---|---|---|---|
| 3,497,690 | 2/1970 | Wheeless, Jr. et al. | 250/71 R |
| 3,327,117 | 6/1967 | Kamentsky | 250/83.3 UV |
| 3,470,373 | 9/1969 | Brewer et al. | 250/71 R X |

*Primary Examiner*—James W. Lawrence
*Assistant Examiner*—Davis L. Willis
*Attorney*—Frank C. Parker and Bernard D. Bogdon

[57] ABSTRACT

A cyto-fluorometer incorporating an on-line computer provides, through the use of a slit-scan technique, averaged graphic fluorescence contours of a fluorochromed cell. Cells stained with fluorochrome acridine orange are passed under a slit, and secondary fluorescence is recorded at two separate wavelengths. From the graphic contours, cellular parameters are available including nuclear fluorescence at one wavelength which is related to cellular deoxyribonnucleic acid (DNA) content, cytoplasmic fluorescence at another wavelength which is related to cellular ribonnucleic acid (RNA) content, and the cell nucleus to cytoplasm size ratio (N/C ratio). This technique allows nuclear fluorescence to be distinguished from the non-specific cytoplasmic fluorescence often observed in squamous cells, and lends itself to high speed flow-through analysis for the pre-screening of cellular samples for abnormal cells.

12 Claims, 3 Drawing Figures

LEON L. WHEELESS JR.
STANLEY F. PATTEN JR.
*INVENTORS*

BY

BERNARD D. BOGDON
*ATTORNEY*

COMPUTERIZED SLIT-SCAN CYTO-FLUOROMETER FOR AUTOMATED CELL RECOGNITION

BACKGROUND OF THE INVENTION

1. Field of the Invention

This invention relates to apparatus for analyzing cells from biological specimens and more particularly, to apparatus for exciting secondary fluorescence in a stained cell and for measuring the secondary fluorescence.

2. Brief Description of the Prior Art

A serious problem which encumbers, attempts to automate cytology to a high rate of cell examination through the use of cyto-fluorometry techniques of staining and analysis, involves non-specific staining for RNA and DNA in certain cells which undesirably provides undependable negative-positive reports. Although methods other than those including fluorometry are available for individually analyzing and mass screening cells from biological specimens, none are more promising, for highly effective automated processes, than methods involving screening through a cyto-fluorometer. However, in the course of using such equipments, non-specific staining in certain cells, particularly in the cytoplasm of mature squamous cells, has produced a false positive rate which would be generally unacceptable. Non-specific staining is defined as all staining of cellular materials other than DNA and RNA. Presented with this problem, numerous attempts have been to circumvent the difficulties, utilizing, for example, some of the following methods and equipments.

A microfluorometric scanner was reported on by Robert C. Mellows and Reuben Silver in the publication *Science*, Vol. 114, Oct. 5, 1951, at inclusive pages 356–360, in an article entitled "A Microfluorometric Scanner for the Differential Detection of Cells: Application to Exfoliative Cytology." In the apparatus described in the Mellors et al article, a Nipkon screening disk is used to scan cells to pick up fluorescent light from each cell separately and successively and to transmit the correlative light to a photocell. The apparatus in the Mellors et al., disclosure does not discriminate between the fluorescence from the DNA or from the RNA content whether located in the cell or cytoplasm of the cell. The information obtained from apparatus of the Mellors et al., type, accordingly, is not predictably highly reliable, for the apparatus is unable to discriminate between readings of high fluorescence which can be caused by young squamous cells having a generally increased RNA content, cells overlapped, cells close together, cells having non-specific staining and abnormal cells.

Alternatively, for example, by following differing techniques and by using, for example, the apparatus described in the L. A. Kamentsky U.S. Pat. Nos. 3,327,117 and 3,327,119, there are encountered other difficulties involving readings obtained from examined cells due to inherent limitations in the apparatus and technique.

Kamentsky proposes to detect cancer cells by measuring the total absorption of ultraviolet radiation by the cell. The absorption at one wavelength gives a signal proportional to the total amount of nucleic acid (RNA plus DNA) in the cell while the absorption at a second wavelength is proportional to cellular material other than nucleic acid. The cell is considered abnormal when the signals at the two different wavelengths differ by a given amount. In effect the total nucleic acid, i.e. RNA plus DNA, of the cell is measured. Both RNA and DNA are frequently elevated in a malignant cell. There are many normal cells which have a normal DNA content but increased RNA and many cancer cells which have increased DNA but may have little RNA since they lack appreciable cytoplasm. Therefore it follows that RNA and DNA should be measured separately to distinguish these cell types and the disclosed Kamentsky techniques do not suggest this.

Included also in the Kamentsky patent disclosures are numerous referenced articles and publications which represent the prior art to the present invention, however, none of those listed have specifically addressed the problems relating to screening fluorochromed stained cells.

One particularly important morphological parameter used by cytologists to distinquish normal from abnormal cells is the ratio of the size of the nucleus of a cell to the overall size of the cytoplasm of the same cell, referred to as the N/C Ratio. The ratio is generally computed from the area size of the nucleus and the area size of the cytoplasm. In U.S. Pat No. 3,497,690 issued to applicants et al., there is disclosed in FIG. 17 a television scanning cell size measurement system which operates to calculate cell size by the number of apertures in a mask which are illuminated by fluorescence from the cell. If different wavelength filters are used to scan the illuminated image than the different staining of the nucleus and cytoplasm of the cell should provide absolute information about the cell size. In this case, even if non-specific staining is exhibited, generally reliable results can be obtained because the intensity of illumination at the apertures is different in the nucleus and cytoplasm of the cell. This method has obvious limitations however, since it necessitates conducting a relatively time consuming scan process to acquire the total information to most accurately calculate the N/C Ratio. Accordingly, through the use of this television scanning technique, fluorescence from other non-specifically stained cellular materials may not interfere with the computation of the N/C Ratio, but, as explained the technique is particularly time consuming.

Consideration of developing an alternate technique and apparatus for relating information by dot scanning each cell in an X–Y coordinate relationship has also generally been rejected as a time consuming technique involving a great deal of equipment compiling complex data which would be difficult to process on a real time basis and overall not lend itself to a system for rapid screening.

Therefore considering the techniques available, including those alternate to cyto-fluorometry, a few of which are hereinbefore discussed, seemingly the most desirable results can be obtained from a fast processing technique incorporating a cyto-fluorometer which is capable of effectively processing cells which may exhibit some non-specific staining.

SUMMARY OF THE INVENTION

The present invention provides an apparatus which overcomes the difficulties encountered in the field of cyto-fluorometry due to non-specific staining of cells and provides a technique and apparatus for effectively screening, at a high rate, biological cells including those exhibiting non-specific staining and, additionally, provides a technique for obtaining N/C Ratio in cells whether or not they exhibit non-specific staining. To this end cells are stained, excited to secondary fluorescence at an elongated portion of the cell generally traversing the width of cell, moved relative to the medium for exciting secondary fluorescence to similarly excite secondary fluorescence in other elongated portions of the cell and then the secondary fluorescence emanating from each portion of the cell is measured. Electromagnetic radiation of the wavelengths disclosed in the hereinbefore mentioned U.S. Pat. No. 3,497,690, issued to applicants et al., is known to work quite well in exciting the stained cells to secondary fluorescence.

The repeated measurements of secondary fluorescence taken as the cell is relatively moved is typically processed to provide an averaged scan of the fluorescence distribution along the cell. The averaged scanned fluorescence intensity is suitable to provide a graphic contour of the fluorescence properties of the cell, which pictorially illustrates the general boundaries of the cell and its nucleus.

For simplicity of explanation it will be appreciated that from the graphic contours calculation of the area defined within the graphic contour, for example, at the nucleus can be made, and it will be further appreciated that the area computed represents the intensity of the fluorescence in the nucleus for the most part. The information acquired is used for relative studies between numerous cells to ascertain the degree of abnormality in any one cell.

Electronic peak and level detector apparatus having predetermined settings and other logic circuits acting on the slit-scan data can be provided to identify the boundaries of the cell and nucleus in order to calculate the width of the cell's cytoplasm size C and the width of the nucleus N to determine the N/C Ratio which, as hereinbefore mentioned, is regarded by some to be the most important morphological parameter used by cytologists to distinguish abnormal from normal cells.

It will be appreciated that the measurements recorded in the present invention to determine values for the N/C Ratio are measurements of length related to cell nucleus diameter and total cell diameter. Whether the measurements for N are of the nucleus area or of the nucleus length, approximating its diameter, or whether the measurements for C are of the total cell area, the total cytoplasm area or of the cell length, approximating the cell diameter, the important factor involved is that in a cancerous cell the nucleus is enlarged and computation of the N/C Ratio by using any of the hereinbefore mentioned matched sets of measurements will provide indication of an enlarged nucleus.

It is desirable that the information obtained from the repeated measurements of secondary fluorescence be processed on a real time basis in order to correlate the information with the flowing cell. To this end, a preprocessor unit is provided to receive analog signals from the detectors to perform predetermined functions. A digital computer receives signals direct from the detectors and utilizes the preprocessed information signals to correlate the digital information to swiftly and effectively identify and calculate functions for cell classification. This hybrid system following the detector provides for processing the information for readout in any form and to provide a myriad of information for each individual cell. The processed information in its most simplest form would simply indicate wheter the cell is normal or abnormal.

In conjunction with the informational readout, each cell can be channeled for further processing or analysis if a positive report is indicated, or for disposal if a negative report is indicated.

DETAILED DESCRIPTION OF THE ILLUSTRATED EMBODIMENTS

Figure 1:
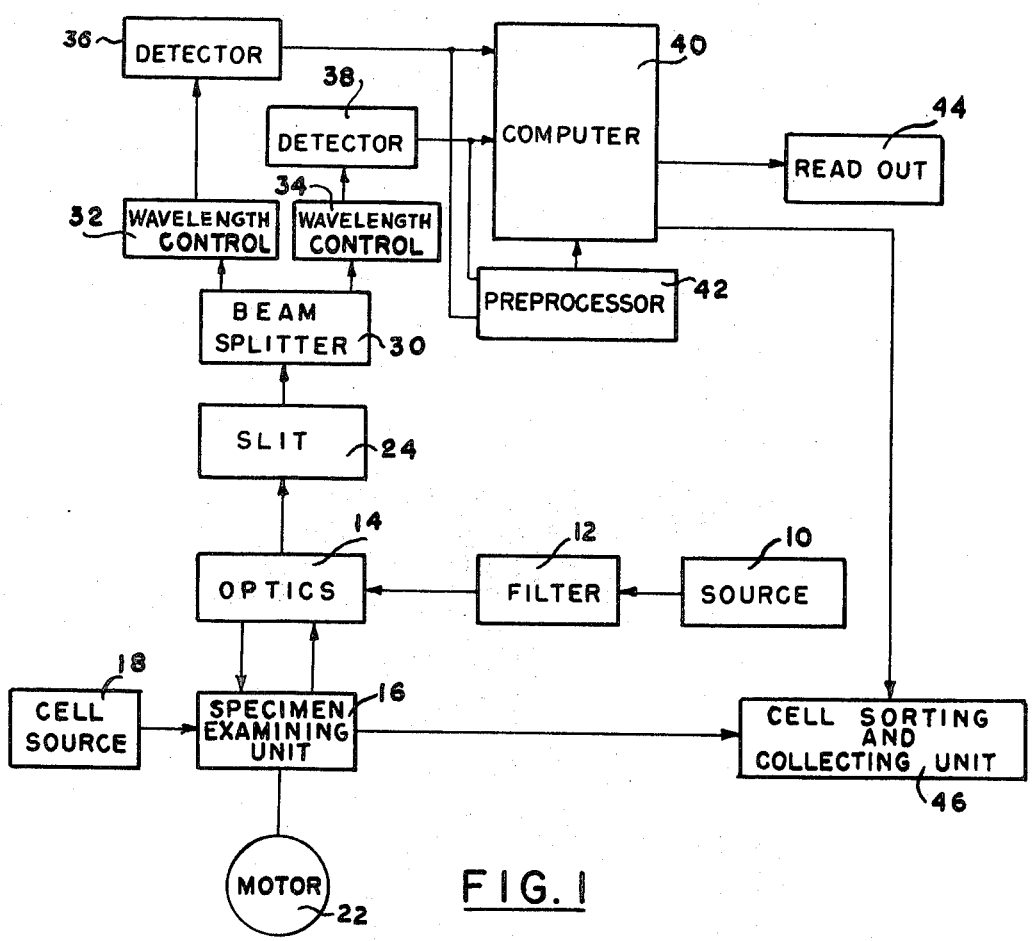
FIG. 1 is a simplified block diagram of an embodiment according to the principles of the present invention.
Figure 2:
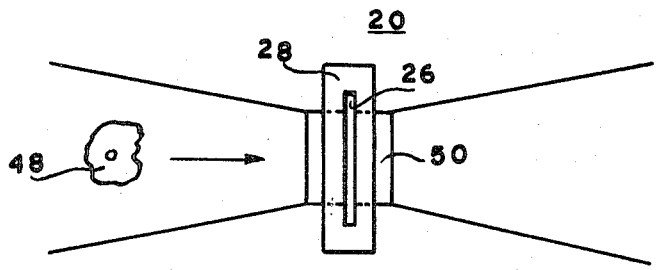
FIG. 2 is a schematic illustration of the view volume and slit unit as illustrated in FIG. 1.

A simplified block diagram of an embodiment according to the principles of the invention is illustrated in FIG. 1 and is in many ways similar to the illustration of FIG. 2 in applicant's Wheeless et al., U.S. Pat. No. 3,497,690, hereinbefore mentioned. In FIG. 1, electromagnetic radiation from a source 10 traverses a path through an excitation filter 12 for controlling the wavelength of the radiation applied through an optics unit 14 to radiate upon a specimen examining unit 16 for exciting secondary fluorescence in a stained cell under examination. Cells for examining are gathered and stained in the manner as described in the mentioned Wheeless et al patent and are collected and stored in a cell source 18 for subsequent introduction into the specimen examining unit 16. As a result of the staining process, cellular materials other than DNA and RNA stain and the otherwise clear cytoplasm of the cell is stained to fluoresce, for example, green at certain wavelengths which fluorescence is recorded to blend with and disguise the fluorescence emanating from the DNA from which an absolute reading of fluorescence is desired but generally unobtainable due to non-specific staining thereby presenting the need for the present invention.

it will be appreciated that the specimen examining unit 16 may be of varied configuration and comprise, for example, in perhaps the simplest form, a slide for affixing thereto a cell for examining. For example, a more sophisticated embodiment of the specimen examining unit 16 comprises a continuous glass tape carrying cells or a view volume flow-through system 20 as generally illustrated in FIG. 2. If the specimen examining unit 16 is not provided with means for mobilizing the cells under examination there is provided for use with, for example, the suggested specimen slide a mechanized unit comprising, for example, a motor 22 for moving the slide and specifically moving the cell being examined relative to the examining optics.

Fluorescence including primary and secondary fluorescence emanating from the stained cell under examination is directed from the specimen examining unit 16 through the optics 14 to a slit unit 24 having defined therein for passage of the radiating fluorescence an aperture 26 in an aperture plate 28 as illustrated, for example, in FIG. 2.

As hereinbefore described, it will be appreciated that movement between the cell under examination and the aperture 26 in the slit unit 24 is relative. In the illustrated embodiment it is convenient to describe the cell under examination as moving relative to the aperture 26 described as being stationary. The specimen slide is mobilized to continuously move before the elongated aperture 26 to present the total cell disposed and oriented upon the slide substantially transversely to the electromagnetic radiation path through the elongated aperture 26. It is obvious that the cells are disposed for individual examination before the elongated aperture 26.

Radiation passing through the elongated aperture 26 of the slit unit 24 traverses upon a beam splitter 30 for individually directing, for example, two wavelength ranges of radiation to wavelength control units 32 and 34, respectively. Each wavelength control unit 32 and 34 may include, for example, a filter wheel, as disclosed in the hereinbefore mentioned Wheeless et al., patent, for sequentially controlling the wavelengths applied to detector units 36 and 38, respectively, for measurement of the fluorescent intensities at a plurality of separate wavelengths. Alternatively, the system can include a dichroic mirror for passing and controlling in cooperation with the filters of the wavelength control units, the wavelengths received by, for example, the detectors 36 and 38 as further described in the hereinbefore mentioned Wheeless et al., patent.

The signals of the detector units 36 and 38 are directed each to a computer 40 and a preprocessor unit 42, in turn, connected to the computer 40. The analytical signals passing through the detector units 36 and 38 are directed, for example, to the preprocessor unit 42 for real time analysis of the cell under examination in the specimen examining unit 16. For example, the preprocessor unit 42 is established to differentiate the analog signals received from detector units 36 and 38 to calculate information relative to the size of the cell C and its nucleus N for introduction into the computer for use in calculating the N/C Ratio and the radiation intensities from each cell portion, i.e. the nucleus and the cytoplasm.

The information received by the computer 40 from the detector units 36 and 38 and the preprocessing unit 42 is processed for use in analyzing and classifying, on a statistical basis the various examined cells. The prefatory classification steps may be as simple as determining whether the N/C Ratio is of a predetermined level or the radiation intensity from a cell portion is of a predetermined level. Once the classification of that cell is determined, it may be desirable to retain that cell in a cell sorting or collecting unit 46 which may be accomplished by a command from the computer 40. A readout device 44 which may, for example, comprise a visual readout or a magnetic tape readout is useful for operational control and/or for recordation of the results. It is possible, for example, in a flow-through system to channel examined cells to either a disposal system if the analysis indicates it as normal or to channel the cell for storage for further examination if the cell is analyzed as being abnormal by use of the cell sorting and collecting unit 46.

In FIG. 2 there is illustrated a preferred embodiment for the specimen examining unit 16 comprising the view volume flow-through system 20. For example, a single stained cell 48 isolated from other cells for traveling in the direction of the illustrated arrow in FIG. 2, is disposed in a suitable fluid and oriented to pass transversely to the electromagnetic radiation passing through the aperture 26 in the aperture plate 28. A specific embodiment of a view volume for disposition immediately before the aperture plate 28, comprises a chamber 50 having, for example, a cubicle dimension wherein each side measures 75 microns. The aperture 26, for example, is 5 microns in width and has an elongated length at least equal to, but preferably longer than the length of an intermediate squamous cell which, for example, may be approximately 60 microns in diameter. In the view volume 20, the rate of flow of the cell 48 is coordinated with the hereinbefore described electronic and optical apparatus to register, for example, approximately 40 measurements across the cell as it traverses before the elongated aperture 26.

In operation, after stimulating secondary fluorescence in a, for example, Euchrysine or Acridine Orange stained cell by irradiation with, for example, radiation wavelengths between 300–500 millimicrons passed through the filter 12, the secondary fluorescence is directed back through the optics 14, the elongated aperture 26 and then to the beam splitter 30 for separating the light energy at different wavelengths. In the example case, the beam splitter 30 in cooperation with the wavelength control units 32 and 34, in typical fashion, passes DNA related fluorescence in the range of wavelengths of 505–555 millimicrons and, for example, specifically at 540 millimicrons and passes RNA related fluorescence in the range of wavelengths of 560–670 millimicrons and, for example, specifically at 655 millimicrons. It will be appreciated that although it is preferred to stain the cells, the herein described apparatus also functions to identify cells that are excitable without prior staining, to exhibit primary fluorescence at a plurality of separate wavelengths.

The detectors 36 and 38 receive the respective wavelengths of, for example, 540 and 655 millimicrons at their varying intensities as the exemplary stained cell 48, traverses before the elongated aperture 26. The signals from the detectors 36 and 38 are directed to the computer 40 and the preprocessor unit 42, as hereinbefore mentioned, to, for example, graphically plot as a function of time the varying intensity of the exemplary wavelengths of 540 and 655 millimicrons, as illustrated in FIG. 3.

Figure 3:
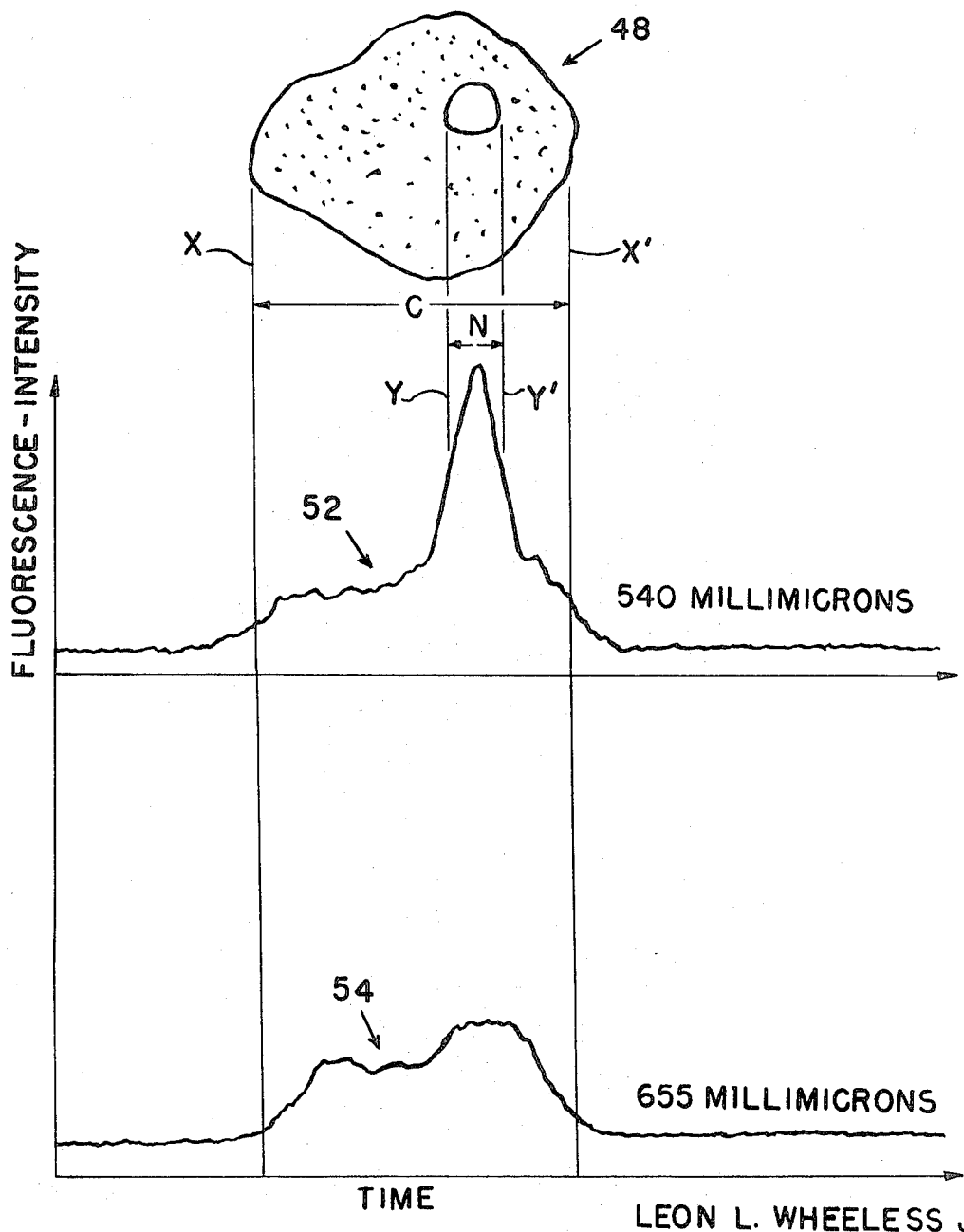
FIG. 3 includes two graphic contours, each recorded at different wavelengths of secondary flourescence corresponding to an exemplary illustrated intermediate squamous cell.

In FIG. 3 contours 52 and 54 are illustrated, respectively, for the exemplary wavelengths 540 and 655 millimicrons. Predetermined parameters from gathered statistical data set the intensity level relationship, changing as a function of time, which correspond to the boundaries of the cell 48 and its nucleus and illustrated by extended lines X and X' and Y and Y'.

As illustrated in FIG. 3, the measured distance, as a function of time, between the X and X' lines corresponds to the value for C for the cell or cytoplasm size and the measured distance, as a function of time, between Y and Y' line corresponds to the value of N for the nucleus size. Since both C and N are similarly measured it is proper to compare them in the N/C Ratio and to use that value as a morphological parameter in the study of cells.

It should be noted that generally the worst conditions of non-specific staining show up, for example, in the contour 52 related to DNA but displaying cytoplasmic fluorescence, commonly referred to as the green fluorescence. Nevertheless, it is obvious the N/C Ratio is easily determinable from the contour 52 when employing the principles of the present invention. It is also obvious that if there is no non-specific fluorescence than C can be obtained from the contour 54 and N from the contour 52 to compute the N/C Ratio. It is also obvious that the curves are useful in calculating the intensity of the fluorescence at various portions of the cell for statistical comparison with gathered information for classification of the cell.

The use of the herein disclosed averaged scan method and apparatus provides data which, as presented, is related to cellular DNA and RNA content, which information is useful in the computation of fluorescence intensities and the N/C Ratio, both very important parameters of study in the field of cytology.

Having thusly described our invention in the hereinbefore described embodiment, we claim the following:

1. An apparatus for exciting secondary fluorescence in a fluorochromed stained biological cell, comprising:
   first means for providing a narrow substantially elongated beam of electromagnetic radiation having a wavelength in the range of 300–500 millimicrons for exciting secondary fluorescence in the stained cell; and
   second means for producing a sweep of the narrow substantially elongated beam of electromagnetic radiation relative to the cell by providing relative movement between the stained cell and the beam of electromagnetic radiation provided by the first means thereby exciting the secondary fluorescence at continually differing narrow elongated portions of the cell so as not to excite secondary fluorescence in the total cell at any one time.

2. In combination, the apparatus for exciting secondary fluorescence in the stained cell, as defined in claim 1, and means for measuring substantially coincident with the sweep relative to the cell secondary fluorescence emanating from the continually differing narrow substantially elongated portions of the stained cell so as not to measure secondary fluorescence in the total cell at any one time.

3. The apparatus for exciting and the means for measuring secondary fluorescence in the stained cell, as defined in claim 2, wherein:
   the means for measuring the secondary fluorescence from each of the differing portions of the cell, includes means for simultaneously measuring the fluorescence at a plurality of wavelengths.

4. The apparatus for exciting secondary fluorescence in the stained cell, as defined in claim 1, wherein:
   the means for providing a beam of electromagnetic radiation having a wavelength in the range of 300–500 millimicrons for exciting secondary fluorescence in the stained cell at continually differing narrow substantially elongated portions of the cell, includes means defining an outline for the beam of electromagnetic radiation sufficiently narrow so as not to excite secondary fluorescence in the total cell at any one time and substantially elongated to at least extend from any inner portion of the cell to a peripheral portion of the cell.

5. The apparatus for exciting secondary fluorescence in the stained cell, as defined in claim 1, wherein said second means for producing a sweep of the narrow substantially elongated beam of electromagnetic radiation by providing relative movement between the stained cell and the beam of electromagnetic radiation, comprises:
   a slide for carrying the cell; and
   a slide mover for moving the cell bearing slide before the narrow substantially elongated beam of electromagnetic radiation.

6. The apparatus for exciting secondary fluorescence in the stained cell, as defined in claim 1, wherein said second means for producing a sweep of the narrow substantially elongated beam of electromagnetic radiation by providing relative movement between the stained cell and the beam of electromagnetic radiation, comprises:
   a device carrying fluid for flowing the cell before the narrow substantially elongated beam of electromagnetic radiation.

7. An apparatus for measuring secondary fluorescence in a fluorochromed stained biological cell excited to fluoresce, comprising:
   measuring means including a narrow substantially elongated aperture of a width dimension substantially less than any dimension across the excited cell for measuring therethrough secondary fluorescence emanating from the excited cell; and means for producing a sweep of the cell relative to the narrow substantially elongated aperture of the measuring means to present the narrow substantially elongated aperture before only a portion of the cell at any one time so as not to measure the secondary fluorescence of the total cell at any one time.

8. A method of examining a cell from a biological specimen, comprising the steps of:

staining the cell with fluorochrome;

transmitting toward the cell a narrow substantially elongated beam of electromagnetic radiation having a wavelength in the range of 300–500 millimicrons to excite secondary fluorescence in only a single narrow substantially elongated portion of the stained cell at any one time; simultaneously, sweeping the stained cell relative to the narrow substantially elongated beam of electromagnetic radiation to transmit the narrow substantially elongated beam of electromagnetic radiation to continually changing substantially elongated portions of the cell so as not to excite secondary fluorescence in the total cell at any one time; and simultaneously, measuring individually the secondary fluorescence emanating from each of the continually changing substantially elongated portions of the cell so as not to measure the secondary fluorescence from the total cell at any one time.

9. The method of examining the cell from the biological specimen, as defined in claim 8, wherein the step of measuring the secondary fluorescence, comprises:

inserting in the path of the secondary fluorescence radiation emanating from the elongated portions of the cell, an aperture element defining an aperture having an opening in size and shape at least equal to an outline defined by the perimeter of the narrow substantially elongated beam of electromagnetic radiation at the cell;

aligning the aperture with the path of the secondary fluorescence radiation emanating from each of the elongated portions of the cell so as not to receive through the aperture radiation emanating from the total cell at any one time; and then measuring the secondary fluorescence passing through the defined aperture during the step of sweeping the stained cell relative to the narrow substantially elongated beam of electromagnetic radiation.

10. The method of examining the cell from the biological specimen, as defined in claim 8, wherein sweeping the stained cell relative to the narrow substantially elongated beam of electromagnetic radiation, comprises:

affixing the cell on a slide; and then passing the cell carrying slide before the narrow substantially elongated beam of electromagnetic radiation.

11. The method of examining the cell from the biological specimen, as defined in claim 8, wherein sweeping the stained cell relative to the narrow substantially elongated beam of electromagnetic radiation, comprises:

flowing the cell in a fluid before the narrow substantially elongated beam of electromagnetic radiation.

12. A method of examining a cell from a biological specimen, comprising the steps of:

staining the cell with fluorochrome;

sweeping the stained cell relative to a narrow substantially elongated aperture in an aperture element; simultaneously, exciting secondary fluorescence in the stained cell; and simultaneously, measuring at a minimum of one predetermined wavelength in the range of 500–700 millimicrons the secondary fluorescence which emanates from the cell and passes through the narrow substantially elongated aperture during the simultaneous step of sweeping the stained cell relative to the narrow substantially elongated aperture so as not to measure the secondary fluorescence emanating from the total cell at any one time.

* * * * *